United States Patent [19]
Bostica et al.

[11] Patent Number: 5,526,156
[45] Date of Patent: Jun. 11, 1996

[54] DEVICE FOR THE PHASE REALIGNMENT OF ATM CELLS OPTICAL ATM NODES

[75] Inventors: Bruno Bostica; Paola Cinato, both of Turin; Libero Zucchelli, Mantova, all of Italy

[73] Assignee: Cselt-Centro Studi E Laboratori Telecomunicazioni S.p.A., Romoli, Italy

[21] Appl. No.: 404,954

[22] Filed: Mar. 16, 1995

[30] Foreign Application Priority Data

Mar. 31, 1994 [IT] Italy .................................. TO94A0241

[51] Int. Cl.$^6$ .................................................. H04J 14/08
[52] U.S. Cl. ........................... 359/140; 359/123; 359/139; 370/60.1
[58] Field of Search ..................................... 359/123, 117, 359/135–136, 139–140; 370/60.1, 94.1

[56] References Cited

U.S. PATENT DOCUMENTS

| | | | |
|---|---|---|---|
| 5,105,292 | 4/1992 | Le Roy et al. | 359/123 |
| 5,303,078 | 4/1994 | Brackett et al. | 359/123 |
| 5,430,722 | 7/1995 | Jacob et al. | 370/60.1 |

FOREIGN PATENT DOCUMENTS

| | | |
|---|---|---|
| 411562 | 2/1991 | European Pat. Off. . |
| 0533391 | 3/1993 | European Pat. Off. ............... 359/139 |

OTHER PUBLICATIONS

Optical Computing, Mar. 16–19, 1993, Palm Springs, CA, 1993 Technical Digest Series, vol. 7.

Primary Examiner—Leo Boudreau
Assistant Examiner—Kinfe-Michael Negash
Attorney, Agent, or Firm—Herbert Dubno

[57] ABSTRACT

The device for the phase realignment of ATM cells in an optical ATM switching node is associated with each input line (Fe) of node and includes a circuit for recognizing the beginning of a cell, a circuit for evaluating the time shift between of a cell and a reference instant and for generating an error signal (ER) depending on the amount of time difference, and a delay line for compensating the time difference, driven by the error signal (ER). The time difference compensator means includes a logarithmic optical delay line that is connected upstream of the device for recognizing the beginning of a cell and for evaluating the amount of the time difference.

8 Claims, 4 Drawing Sheets

DEVICE FOR THE PHASE REALIGNMENT OF ATM CELLS OPTICAL ATM NODES

FIELD OF THE INVENTION

The present invention relates to switching nodes of optical fast cell switching networks, or ATM (Asynchronous Transfer Mode) networks, and more specifically to a device for the phase realignment of the cells incoming to one such node.

BACKGROUND OF THE INVENTION

The ATM technique is taking on a growing importance for the transport and switching of digital flows at very high speed, such as those present in wide band integrated services digital networks. In this technique, the information associated with the various services is organized into contiguous packets of fixed length (about 400 bits), called "cells", formed by an information field and a header field (tag) that carries service information, including the information necessary for the routing through the network.

In an ATM network, the switching nodes must carry out two fundamental tasks: routing of the cells (thus performing a space switching function), and avoidance of possible conflict situations, which occur when several cells entering the node simultaneously from different inputs have to be routed toward the same output (thus the node also performs a memorization function). In order to satisfy the requirements for bit rate and bandwidth of modern integrated services networks, ATM switching nodes based on optical techniques have been proposed. There, both muting and memorization are performed by means of optical devices. In this way, it is possible to operate at very high bit rates, of the order of Gbit/s. An example of a node of this type is described, for instance, in European Patent Application EP-A-0 411 562.

In a communication system based on the ATM technique, the flows of cells containing information emitted by the various transmitting stations can arrive at the switching node with random phases. The optical systems so-far proposed require, in order to correctly operate, that the cells arrive at the various node inputs at predefined instants and therefore the need arises for a phase realignment or synchronization of the cells. In a large optical switching node, comprising a multi-stage network, there may be a need for further synchronization, due to the uncertainty about the length of the optical paths that the cells travel through in the node. In the first case, the cell synchronization system must be able to recover relatively high phase shifts, above all at the beginning of a transmission (for example phase shifts of up to a cell time or even more), whereas in the second case the phase shift to be recovered may be much smaller, of the order of a few nanoseconds.

The synchronization of the ATM cells arriving at the different inputs of a single-stage optical switching node is described in European Patent Application EP-A-0 411 562 mentioned above. The phase realignment is performed by temporarily storing signals convened into electrical form, within the devices performing the tag processing necessary for muting. The possibility to directly operate on optical signals is also suggested. However, efficient digital optical memories are still unavailable and, in any case, their use increases system realization and management complexity.

In Italian Patent Application No. TO 93A000956, filed on 16 Dec. 1993, (corresponding to U.S. Ser. No. 08/331,202 of 28 Oct. 1994), a method and a device are described for the fine synchronization of ATM cells, suitable to recover the limited phase shifts that can occur in steady state conditions at node inputs or those due to small path differences within a node. A cell to be realigned is sent into a span of an optical fiber with high chromatic dispersion, of a predefined length, after having been associated with an optical rephasing carrier whose wavelength is such that, due to transit along the fiber, the cell reaches a node switching element input at a predefined instant. There are provided: means for extracting a function of the optical signal associated with the cell to be realigned; means for recognizing the beginning of a cell, by using said optical signal fraction, and for generating a signal representing the occurred recognition; means for receiving the signal representing the occurred recognition of the beginning of the cell, for comparing it with a signal representing a reference instant and for generating an error signal indicative of the entity of the phase shift between the two signals, and a tunable wavelength converter, driven by said error signal, to transfer the cell to be realigned from an original carrier, with which the cell received by the device is associated, to the rephasing carrier.

Such a method and a device are not able to recover the initial cell phase shift, that can be rather high. Moreover, phase shifts, that in steady state conditions are essentially due to thermal drifts, accumulate in time and therefore, at a certain time, the latter method and device are no longer effective.

OBJECT OF THE INVENTION

The object of the invention is to provide a device for the phase realignment of ATM cells that enables presenting the cells at the same moment to the node cells from different flows, allowing both compensating of the initial phase shifts and preventing of possible variations of steady state phase shifts.

SUMMARY OF THE INVENTION

The device includes, for each input line, means for extracting a fraction of the optical power associated with a call incoming to the node; means for recognizing the beginning of a cell, by using said optical power fraction, and for generating a signal representative of the occurred recognition; means for evaluating the phase shift of a cell with respect to a reference instant, which means receives the signal of occurred recognition of the beginning of the cell, compares it with a local reference signal and generates an error signal representative of the phase shift entity; and means for compensating the phase shift, driven by the error signal.

The means for compensating the phase shift includes a logarithmic optical delay line, that is connected upstream of the extracting means and is composed of a chain of optical switches mutually connected both via a direct path, that does not substantially introduce a delay on the cells travelling through it, and via a delay element, that introduces on the cells a fixed delay decreasing, according to a constant ratio, from one element to the next following element along the signal propagation direction along the delay line, the last element introducing a delay corresponding to a minimum delay variation step.

The optical switches are slow switches of which the switching time is much greater than a cell duration and that are actuated individually and independently from one another by means of control signals obtained from the error signal, to insert on the cell path the delay elements adapted to compensate the detected phase shift.

The last delay element and the corresponding last path with substantially null delay end at the inputs of a fast optical switch, with switching time comparable with the cell bit time or with a fraction thereof.

The means for evaluating the phase shift entity generates a digital error signal where each bit is associated with a delay line switch and sets such switch in a straight or cross position, according to its logic value, such digital signal obtaining phase shift compensation by the delay line, under steady state conditions, by actuating a single switch at a time.

Use of a logarithmic delay line for the synchronization of two optical packet flows is described in the paper "Time of Flight Packet Synchronizers" submitted by C. E. Love and H. F. Jordan at the "Optical Computing" Conference, 16–19 Mar. 1993, Palm Springs (Calif., USA) and issued in 1993 Technical Digest Series, Vol. 7, page 326 and ff. In the system described in this paper, every switch in the delay line sends on the longest path (delayed path) the first signal arriving at its input and on the non-delayed path the second signal, and the phase shift between the two flows is halved at every step along the delay line. This type of system cannot be used to synchronize cells of a plurality of ATM flows with respect to a common synchronization signal. In fact, even supposing that the synchronization signal be assimilated to one of the flows incoming to the logarithmic delay line, the output signal phase cannot be guaranteed a priori; moreover, phase alignment with the synchronization signal cannot be guaranteed for signals present on different outputs of logarithmic delay line, which signals would have to be mutually realigned, making the system extremely complex.

BRIEF DESCRIPTION OF THE DRAWING

The above and other objects, features, and advantages will become more readily apparent from the following description, reference being made to the accompanying drawings in which.

SPECIFIC DESCRIPTION

Figure 1:
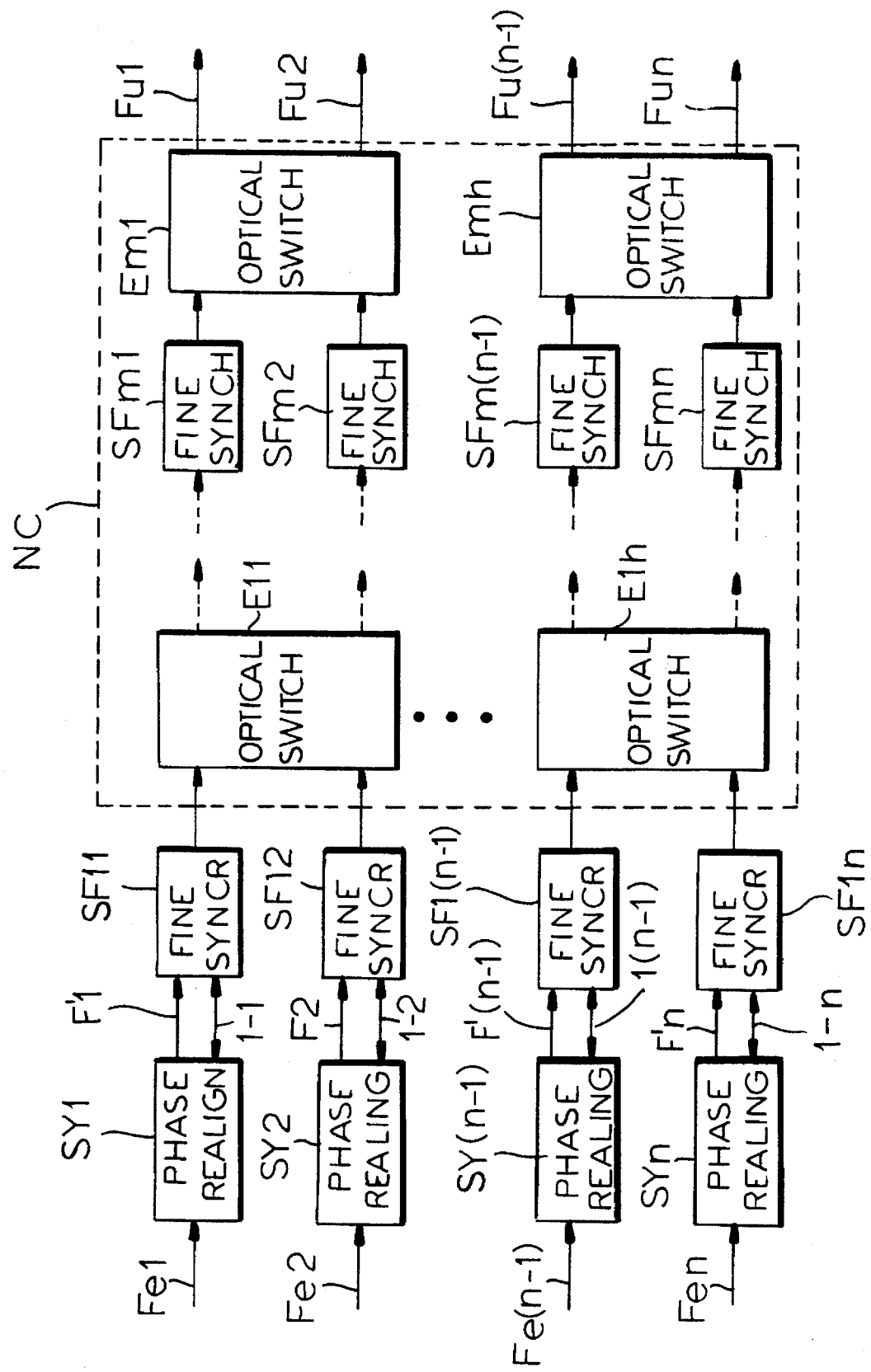
FIG. 1 is a block diagram of a switching node utilizing the invention.

In the drawings, thick lines show the optical signal path and thin or double lines show the electric signal path.

FIG. 1 shows the connection network NC of an optical ATM switching node with n inputs and n outputs connected to respective optical fibers Fe1 . . . Fen, Fu1 . . . Fun. The node comprises, in the most general case, m stages composed of elements E11 . . . E1h . . . Em1 . . . Emh that, purely as an example, are represented as elements with two inputs and two outputs. The structure of the node and of the switching elements has no interest for the purposes of the present invention. In general, at any rate, current ATM optical nodes comprise an optical connection network and an electrical control structure; the latter is not indicated in the drawing because it is not influenced by the invention. Input fibers Fe1 . . . Fen are associated to devices SY1 . . . SYn which perform a phase realignment of the cells, by discrete steps. The cells phase-realigned by devices SY are supplied through fibers F1 . . . F'n to fine synchronization devices SF1 . . . SFn aimed to continuously compensate for remaining phase shifts. Furthermore, since response times of devices SY are relatively long, as will be better seen afterwards, devices SF can also operate in place of devices SY in the periods when the latter respond to the detection of a phase shift. In order to allow cooperation, devices SY, SF will exchange information through connections 1-1 . . . 1-n. Fine synchronization devices SFm1 . . . SFmh are also associated with the inputs of the stages following the first one in node NC, to compensate possible optical path differences of the cells between a stage and the following one.

Devices SF can be of the type described in the already mentioned Italian Patent Application.

Figure 2:
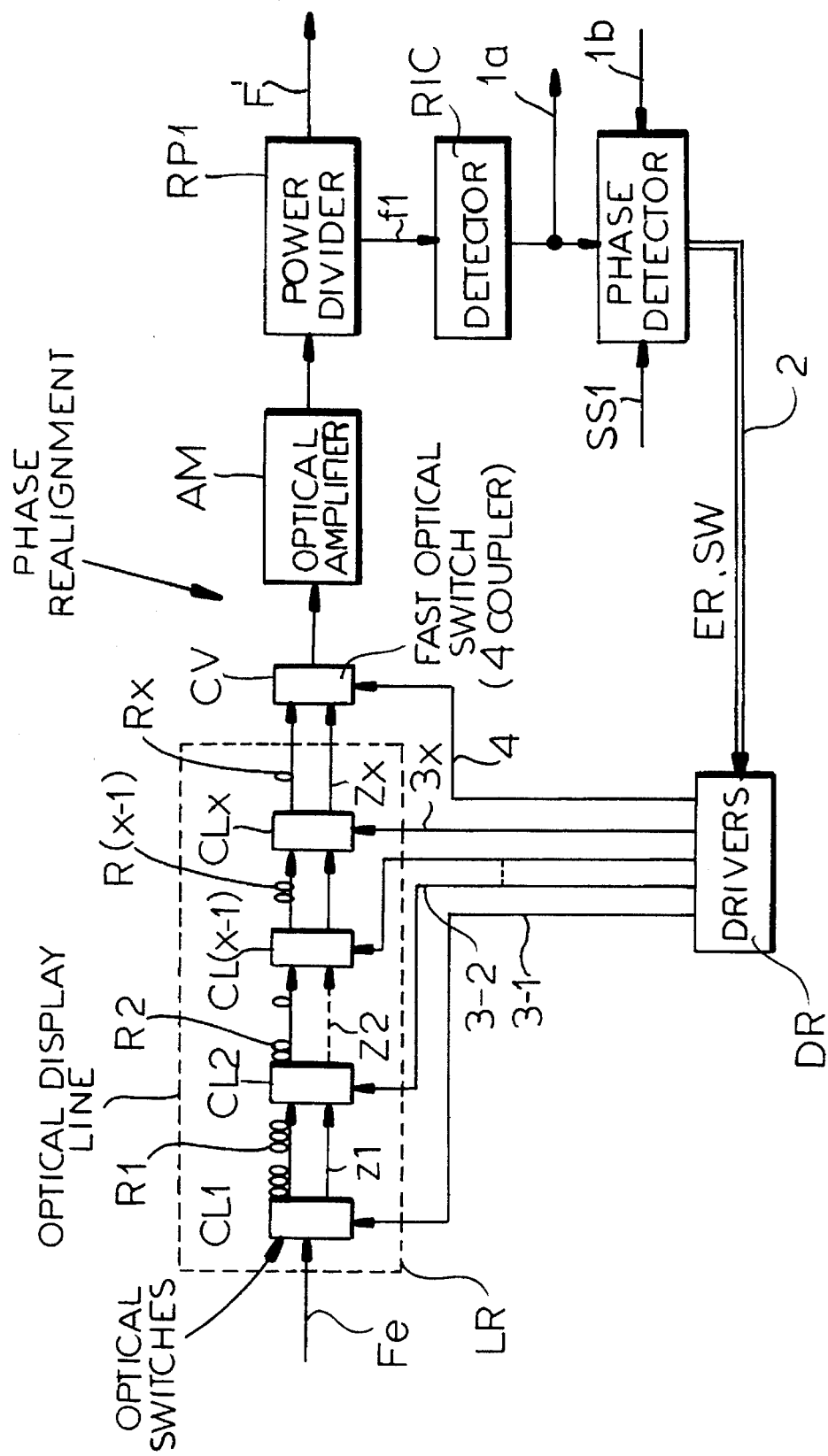
FIG. 2 is a block diagram of the device according to the invention.

FIG. 2 shows a preferred embodiment of a device SY. For this embodiment, let us assume that ATM cell flows incoming to the node are substantially continuous flows, apart from a guard time between subsequent cells that is necessary to enable setting of the node elements and operation of the synchronization device, as will be better explained below. As an example, where necessary, reference will be made to a transmission at 622 Mbit/s, with cells formed by 64 bytes, so that every bit lasts 1.6 ns. The guard time can for example be 7 bytes long (therefore about 100 ns), within the 64 bytes.

As can be seen in the Figure, fiber Fc is connected to an optical delay line LR with variable delay, capable of delaying the incoming signal for the time necessary to realign the cell with a local reference signal (hereinafter also called "synchronization signal"). The delay line LR is a so-called logarithmic delay line, realized through optical switches CL1 . . . CLx with two inputs and two outputs, that send signals either on a direct path Z1 . . . Zx, whose delay can be considered null, or on a delay element R1 . . . Rx, that delays signals travelling through it by a fixed time that is progressively decreasing according to a constant ratio, in particular equal to 2. Paths Z1 . . . Zx and elements R1 . . . Rx are optical fiber spans of suitable lengths. The delay introduced by the last delay element Rx of the line is a fraction of the maximum delay that can be compensated by devices SF, to allow overlapping between the operations of the two devices. For example, if devices SF compensate phase shifts up to one bit time (1.6 ns in the example taken into account), the delay introduced by Rx can be ¼ of the bit time (400 ps). The number of switches CL1 . . . CLx and therefore of delay elements R1 . . . Rx will obviously determine the maximum phase shift that can be compensated by LR. In practice, 11 elements R1 . . . Rx can be employed, with delays ranging from ½ cell (256 bits, about 400 ns) to ¼ bit, so that delays included between about 0 and 800 ns (1 cell) can be compensated by steps of 400 ps.

Optical switches CL1 . . . CLx, that can be controlled individually and independently from one another, have no particular speed requirements and are for example thermo-optical couplers. These switches have a switching time of the order of a few milliseconds. Switching of switches CL1 . . . CLx is controlled by signals supplied through wires 3-1 . . . 3-x by drivers DR, which bring to the level necessary for the switch control, the bits composing a digital error signal ER supplied through a connection 2 by a circuit VE determining the phase shift entity. In particular, as will be better seen below, every bit in signal ER is associated with one of switches CL and causes that switch to be set to a straight position for example when the bit has logic value 0 and to a cross position when it has logic value 1.

The last delay element Rx and the last direct path Zx are connected to the two inputs of a further, relatively fast optical switch (or Y coupler) CV, for example a LiNBO3 switch. Such a switch has a switching time less than 1 ns.

Switching of CV is controlled by a signal supplied by drivers DR through a wire 4 and obtained from a signal SW emitted by VE: value 0 of such signal causes for example switching of CV on the input connected to path Zx, while value 1 causes switching of CV on the input connected to the element Rx. Also the two positions of CV will be denoted as straight and cross positions. Use of switches like CV within a delay line is not convenient, both because they are much more expensive than the thermo-optical couplers, and because they are sensitive to optical signal polarization, whose maintenance along delay line LR cannot be guaranteed by using conventional fibers and would require use of polarization maintaining fibers that are much more expensive.

The output of CV is connected to an optical amplifier AM, that compensates attenuations introduced by delay line LR and is followed by an asymmetric power divider RP1 that sends a small fraction (for example 1/10) of the optical signal power associated with a cell to a detector RIG of the beginning of a cell, through a fiber span f1. The remaining power is sent to output F' of device SY.

Detector RIC can be realized as described in the above-mentioned Italian Patent Application, and is based on the recognition of an initial cell word, in particular a 4-bit word. Its structure will be described with reference to FIG. 3. Detector RIG generates a signal IC representing the occurred recognition, that is sent to circuit VE and to a circuit having the same functions as VE in device SF through a wire 1a of one of the respective connections 1 (1-1 ... 1-n).

Circuit VE determines the entity of the phase shift between cell-beginning signal IC and a local reference or synchronization signal SS1, that is the same for all devices SY and is supplied by the time base of the node (not shown). For its operation, VE receives through wires 1b of connection 1 information about the phase shift entity measured by the homologous device in SF. As will be seen after, circuit VE is realized so that in steady state conditions the error signal compensates possible phase shifts through actuation of a single switch CL.

Figure 3:
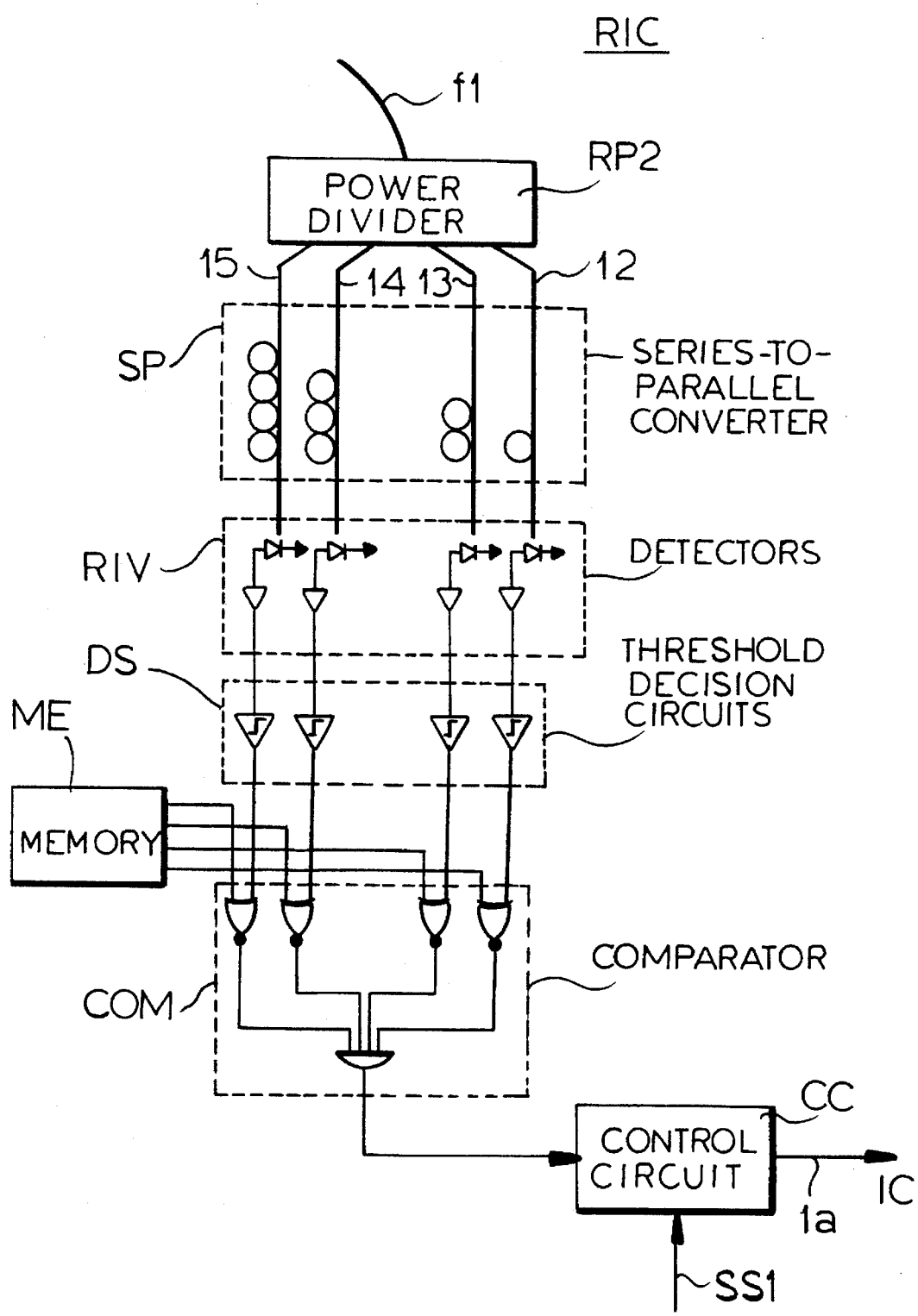
FIGS. 3, 4 are more detailed diagrams of some of the blocks in FIG. 2.

In FIG. 3, device RIG includes a second power divider RP2 that shares the power present on f1 among four different outputs connected to respective optical fiber spans f2 ... f5. The four fiber spans have such a length that signals go out of f3, f4, f5 with a delay respectively exceeding by 1, 2 or 3 bit times the delay introduced by f2. Fiber spans f2 ... f5 form therefore an optical series-to-parallel converter SP. The four bits of the initial word are detected in parallel in as many detectors represented within block RIV and, after having been convened into logic signals by threshold decision circuits DS, are supplied to a comparator COM that compares the pattern present at the output of RIV with the pattern foreseen for the initial word, read in a memory ME. Should the comparison outcome be positive, comparator COM sends a signal with an adequate logic level (for example level 1). The output of comparator COM is connected to a control circuit CC, that must verify that the word recognized by the comparator is really the initial word and not an identical pattern present in the dam in a cell. For example, control circuit CC will send on output wire 1a the cell beginning signal IC only if comparator COM has issued a "1" signal for a predefined number of times (for example 4) at intervals of one cell time. For this purpose, CC will have to receive synchronization signal SS1. Devices like control circuit CC are well known in the art.

Figure 4:
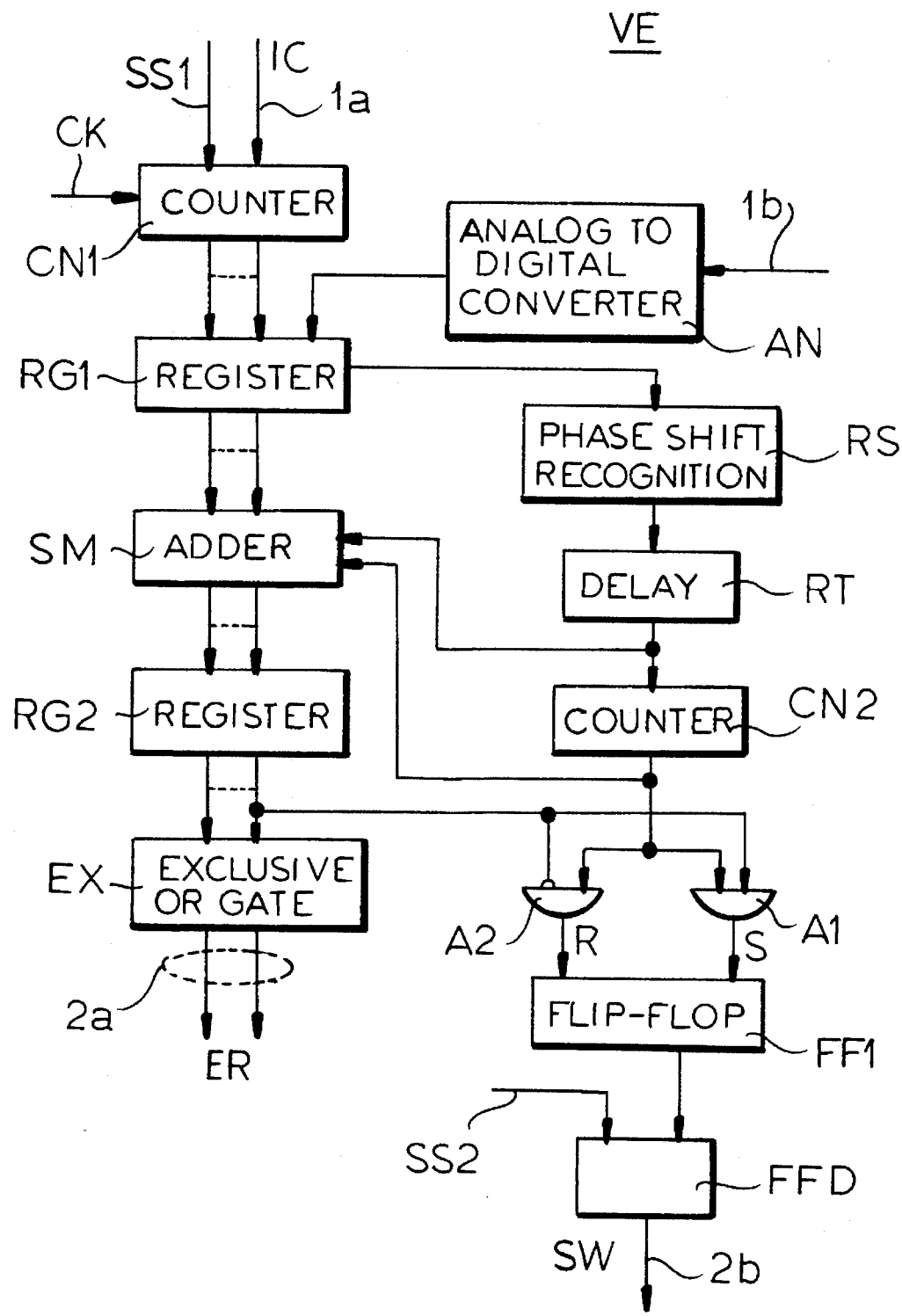

FIG. 4 shows a preferred embodiment of device VE. The device includes a (x−2)-bit counter CN1 that is started by the synchronization signal SS1 and is stopped by the cell beginning signal IC (or vice versa) and counts the pulses of a clock signal CK at the transmission rate on fiber Fe. Counter CN1 then evaluates phase shift between the two signals with the precision of one bit time. Preferably, counter CN1 is realized so that the binary value read at the count stop instant represents the delay to be introduced on the cell to obtain realignment with the synchronization signal. The count reached by counter CN1 at the stop instant is loaded into a first x-position register RG1, that loads into the two least significant positions a pair of bits supplied by an analog-to-digital converter AN that converts into digital signals the phase shift value measured by device SF. With such an arrangement, each one of the x bits in register RG1 is associated with one of the elements Ra ... Rx and indicates, when it is at 1, that the associated element must be inserted along the optical signal path. The content of register RG1 is supplied to adder SM where it is added to the value contained in a second register RG2, where the phase shift compensated up to the immediately preceding cell is stored. The result of the addition is loaded into register RG2 to update the content thereof. Adjacent bits of the content of register RG2 are combined in exclusive OR in a combinational network EX to generate the error signal ER, composed of x bits that are presented on a first group 2a of wires of connection 2. The least significant bit of the value stored in register RG2 will further be transformed into command SW for CV, through AND gates A1 and A2, a set-reset flip-flop FF1 (that receives this bit at its set or reset input depending on the logic value being 1 or 0) and a D flip-flop FF2.

The bits stored in register RG1 are also supplied to a phase shift recognition device register RS, in practice a logic NOR gate, that recognizes that at least one bit in RG1 is different from 0. In case of a phase shift, the phase shift recognition device RS generates a signal that starts the count, by a counter CN2, of a time T1 sufficient to guarantee that more than 50% of the optical power is present on the desired output of switches CL1 ... CLx (for example a 3 ms time). The signal generated by phase shift recognition circuit RS is supplied to counter CN2 after having been delayed in a delay element RT by the time necessary to perform the addition in SM and to update register RG2. The signal going out of delay element RT also disables counter CN1: this is necessary since device SY is able to process a new cell only after switching of switches CL (FIG. 2). The terminal count signal of counter CN2 enables transferring the least significant bit of RG2 to FF1 through gates A1, A2. The actual signal SW is then generated through flip-flop FF1, to enable switching of optical switch CV during the guard time between two consecutive cells, which is signalled by a second synchronization signal SS2 also generated by the system time base. The terminal count signal of counter CN2 also enables again counter CN1.

Operation of the invention will now be described, referring, for the sake of simplicity, to an example in which delay line LR includes 5 delay elements R1 ... R5 that introduce delays from 400 ps to 6.4 ns (from 1/4 of the bit time to 4 bit times), so that delay line LR is able to compensate phase shifts up to 12.8 ns. For the operation, a distinction must be made between a transient period, corresponding to the beginning of a transmission on the line concerned and during which even important phase shifts will have to be compensated, and a steady state condition, in, which phase shifts are supposed to be limited and slowly variable: this is typical, for example, of phase shifts due to thermal drifts. As long as the initial phase shift is not compensated, all cells will be lost.

Let us suppose that initially switches CL1 . . . CL5 are arranged in a straight configuration, so that incoming signals on fiber Fe are forwarded along null-delay paths Z1 . . . Zx and therefore they immediately reach the phase shift determining devices. Obviously optical switch CV too will be in a straight position. The first operation to be performed is locking device SY to cell synchronism SS1. Locking is obtained when control circuit CC in device RIG (FIG. 3) has recognized the initial bit pattern, for the predefined number of times, at intervals corresponding to the cell period. After such locking has been achieved, SY is actually able to operate. The first signal IC starts counter CN1 which counts the pulses of CK till the instant shown by SS1. Let us suppose that phase shift is 4.5 ns (that is a phase shift between 2 and 3 bits and more precisely between 2¾ bits and 3 bits). The value read in counter CN1 at that moment will be 010 and the pair of bits supplied by SF will be 11: these 5 bits are loaded into RG1 and are stored unmodified in RG2 and transformed by EX into error signal 01110, that sets CL2, CL3, CL4 to cross position, while CL1 and CL5 remain in straight position: the cells therefore follow the path Z1, R2, Z3, R4, R5 that inserts a global delay of 4.4 ns (3.2 ns, that is 2 bits, in R2, ½ bit=0.8 ns in R4 and ¼ bit =0.4 ns in R5). A phase shift having been recognized, the count of time T1 is started. At the end of the count of T1, the least significant bit of register RG2 is transferred to the output of FF1 through gate A1 to generate SW. Since this bit is 1, optical switch CV is set to cross position, and therefore it actually transfers to its output the signals coming out of the last delay element. From that instant on, the cells going out of delay line LR are in phase with SS1, apart from the remaining phase shift of 0.1 ns that is compensated by SF, and the steady state condition is reached.

For the first cell arriving at RIC after the steady state condition has been reached, register RG1 will contain all 0's; the content of RG2 and the position of switches CL, CV do not change. The situation remains unchanged as long as the phase shift between signals IC and SS1 if any, remains less than ¼ of a bit time: SY does not intervene and possible variations of the instants of arrival of the cells are compensated by SF. If at a certain instant the phase shift reaches ¼ of the bit time (taking the global phase shift to 4.9 ns), the least significant bit supplied by AD becomes 1. Pattern 00001 is now present in RG1 and, when added to the one present in RG2 (01011), results in a new pattern 01100 that is transformed by EX into the new error signal 01010. Consequently, switch CL3 is set to the straight position and the cells now follow path Z1, R2, R3, Z4, Z5 that compensates a 4.8 ns phase shift. The remaining 0.1 ns phase shift is compensated by SF as above.

As it can be noted, only one bit has changed in error signal ER with respect to the previous pattern, in particular the bit associated with the third switch CL3, that will be set to a straight position in order to insert delay element R3. As a consequence of the change of position in CL3, R4 and R5, that were previously inserted, will remain cut off. Furthermore, the least significant bit in RG2 has become 0, and this corresponds to extracting the signal from Z5. As during the transient time, adder SM is inhibited during switching time T1 of switches CL and therefore SY does not carry out any action on the cells following the one taken into account, till after the possible CV switching. However, even during that time, pan of the power goes on arriving to divider RP1 along the previous path and it is supplied to SF, that compensates the detected phase shift: since the optical signal path variation has been supposed to be much slower than the switching time of switches CL, the phase shift will surely be within the operation range of SF.

It is immediately apparent that, with the described arrangement, if a slow phase shift variation is assumed, whichever the configuration assumed by switches CL to compensate the initial phase shift, under steady state conditions, the variation of a single thermo-optical switch always occurs upon the least significant bit in RG1 becoming 1. This allows obtaining the phase realignment without losing information, in spite of the switches CL being slow. Should more than one switch be actuated, a superimposition of differently delayed replicas of the same cell would occur, making it impossible to process the cell within the node.

It is obvious that what has been described has been given only as a non-limiting example and that variations and modifications are possible without departing from the scope of the invention, particularly as regards the realization of electronic circuits.

We claim:

1. A device for phase realignment of ATM cells in an optical ATM switching node, to enable cells present on different input lines to appear at node inputs at a same reference instant, the device including, for each input line:

extracting means for extracting a fraction of optical power associated with a cell incoming to the node;

recognition means for recognizing the beginning of a cell, by using said optical power fraction, and for generating a recognition signal representative of the occurred recognition;

phase detection means for evaluating a phase shift entity of a cell with respect to the reference instant, said phase detection means receiving the recognition signal of recognition of the beginning of the cell, comparing the recognition signal with a synchronization signal and generating an error signal linked to a phase shift entity; and compensating means, driven by the error signal, for compensating the phase shift,
said compensating means including a logarithmic optical delay line connected upstream of the extracting means and composed of a chain of optical switches mutually connected both via a direct route null delay path that does not substantially introduce a delay on the cells travelling through it, and via delay element that introduces on the cells a fixed delay decreasing, according to a constant ratio, from one delay element to a following delay element in a signal propagation direction along the delay line, a last delay element introducing a delay corresponding to a minimum delay variation step;

said optical switches being slow switches whose switching time is much greater than a cell duration and being actuated individually and independently from one another by means of control signals obtained from the error signal, to insert on the cell path the delay elements suitable for compensating the detected phase shift;

said last delay element and a corresponding last null delay path ending at inputs of a fast optical switch, with switching time comparable with the cell bit time or with a cell bit time fraction; and said phase detection means for evaluating the phase shift entity generating a digital error signal wherein every bit is associated with a switch in the delay line and setting the switch in a straight or cross position, according to a logic value of the bit, such digital error signal obtaining phase shift compensation by the delay line under steady state conditions, by actuating a single switch at a time.

2. The device according to claim 1 wherein the delay line includes such a number of delay elements as to recover, by steps of a bit time fraction, phase shifts whose entity is of the order of cell duration.

3. The device according to claim 1, further comprising a fine synchronization device for continuous and real-time compensation of phase shifts whose maximum entity is equal to some delay variation steps in said delay line.

4. The device according to claim 1 wherein the phase detection means includes:

means for generating and storing a first digit signal that represents the phase shift between the recognition signal representing the cell beginning and the synchronization signal and includes a group of bits, in one-to-one correspondence with the delay elements in the delay line, which bits indicate, depending on respective logic values whether the corresponding delay element must be inserted on the cell path or not;

a first memory device that stores a second digital signal whose bits also are in one-to-one correspondence with the delay elements in the delay line, the second digital signal representing a delay line configuration that has compensated the phase shifts till the arrival of said cell;

means for updating the second digital signal, by adding the value thereof read from the first memory device and the first digital signal;

a combinational logic network for transforming the updated value of the second digital signal into the error signal; and means for sending the least significant bit of the second digital signal to the fast optical switch as a control signal.

5. The device according to claim 4 wherein the means for generating and storing the first digital signal comprise:

a first counter that provides a bit pattern comprising x-y bits, where x is the number of delay elements in said delay line and y is the number of bits digitally representing the phase shift measured by members for evaluating the phase shift entity in said fine synchronization device, said x-y bits forming the most significant bits of the first digital signal;

an analog-to-digital converter, that receives information about the phase shift measured in the fine synchronization device and supplies said y bits as the least significant bits of the first digital signal; and a second memory device with x positions, that stores the first digital signal and keeps it available to the means for updating the second digital signal.

6. The device according to claim 5, further comprising:

a second combinational logic network, connected to the means generating and storing the first digital signal, to recognize whether this signal indicates the existence of phase shift and generate, when this is the case, a signal representing such recognition;

a delay device for delaying, by a time necessary to update the second digital signal, the signal showing the phase shift recognition; and a second counter, that is started by the signal indicating the phase shift recognition, delayed in the delay device, counts a time that is not less than half the switching time of the chain of optical switches in the delay line and generates a terminal count signal at the end of that time, which signal is a preset signal for the means for sending the control signal for the fast optical switch.

7. The device according to claim 6 wherein the means for updating the second digital signal are disabled by the signal indicating the phase shaft recognition, delayed in the delay device, and are again enabled by a terminal count signal of the second counter.

8. The device according to claim 6 wherein the means for sending the control signal to the fast optical switch receive as enabling signal for the actual emission a signal indicating a guard time between consecutive cells.

* * * * *